United States Patent [19]

Chaker et al.

[11] Patent Number: 4,525,507
[45] Date of Patent: Jun. 25, 1985

[54] HIGH FLASH POINT/LOW SURFACE ENERGY SOLVENT SYSTEMS FOR POLYIMIDE CONFORMAL COATINGS

[76] Inventors: Mouhanad Chaker, 23 Moore Ct., Burlington, Vt. 05401; Roger J. Clark, R.D. #2, P.O. Box 540, Underhill, Vt. 05489; James S. Hayes, 828 Hastings La., Warrenton, Va. 22186

[21] Appl. No.: 567,033

[22] Filed: Dec. 30, 1983

[51] Int. Cl.³ .............................................. C08L 79/08
[52] U.S. Cl. ................................... 524/104; 524/173; 524/233; 524/234; 524/251; 524/317; 524/364; 524/394; 524/600; 524/462
[58] Field of Search .............. 524/600, 233, 234, 104, 524/173, 251, 317, 364, 394

[56] References Cited

U.S. PATENT DOCUMENTS

| | | | |
|---|---|---|---|
| 3,037,966 | 6/1962 | Chow | 524/233 |
| 3,320,202 | 5/1967 | Bolton | 524/600 |
| 3,364,166 | 1/1968 | Barito | 524/600 |
| 3,856,752 | 12/1974 | Bateman | 524/600 |
| 3,887,582 | 6/1975 | Holub | 524/233 |
| 3,937,673 | 2/1976 | Koerner | 524/600 |
| 4,048,142 | 9/1977 | Takeoshi | 524/600 |
| 4,238,528 | 12/1980 | Angelo | 524/600 |
| 4,250,073 | 2/1981 | Tamura | 524/233 |
| 4,489,185 | 12/1984 | Schoenberg | 524/600 |

FOREIGN PATENT DOCUMENTS 2032926  5/1980  United Kingdom ............... 524/600

Primary Examiner—C. Warren Ivy

[57] ABSTRACT

An improved wire enamel consisting essentially of the following materials by weight wherein basis is wire enamel weight; at least 50% by wt. of a polar organic solvent; about 2-8% by wt. of a polyimide precursor which can be cured to yield a polyimide polymer; about 0.5 to about 25% by weight of the substituted aliphatic hydrocarbon solvent for the polyimide precursor having a surface tension and polarity greater than that of the halogenated aliphatic hydrocarbon described below or a substituted aromatic hydrocarbon having a dipole moment less than or equal to the dipole moment of the halogenated aliphatic hydrocarbon described below; about 5 to 40% by wt. of a halogenated aliphatic hydrocarbon; and 0 to about 1% by wt. of an organosilane which increases the adhesion of the polyimide to an underlying substrate.

7 Claims, No Drawings

HIGH FLASH POINT/LOW SURFACE ENERGY SOLVENT SYSTEMS FOR POLYIMIDE CONFORMAL COATINGS

BACKGROUND OF THE INVENTION

1. Field of the Invention

The present invention relates to mixed solvent systems for polyimide materials. The mixed solvent/polyimide systems find particular application in the manufacture of electronic components.

2. Description of the Prior Art

U.S. Pat. No. 4,238,528 Angelo et al discloses a polyimide coating process and a material useful therein where the coating material includes an aromatic polymer which, when cured, forms a polyimide, organic solvents for the polymer including, for example, a combination of 1-methyl-2-pyrrolidone (NMP), NMP/acetone, NMP/Cellosolve, NMP/xylene, NMP/toluene and (2-ethoxyethanol)-Cellosolve/acetone, and a non-ionic fluorocarbon surfactant. Optionally, adhesion promoters such as silanes can be present. There is no disclosure in Angelo et al of using a fluorinated hydrocarbon as per the present invention to achieve a synergistic effect in a system as claimed herein. Since the systems of the present invention can be used with devices as disclosed in this patent, it is hereby incorporated by reference, including the drawings thereof.

U.S. Pat. No. 3,560,426 Adesko et al discloses a coating composition having a low viscosity particularly useful for wire coating which comprises an amine terminated aromatic polymeric precursor of an amide containing polymer and a reactive melamine resin. Various inert organic solvents useful therewith are recited including NMP, N,N-dimethyl formamide, dimethyl sulfoxide, methyl ethyl ketone, etc., which can be used alone or in combination or in combination with poorer solvents such as xylene and toluene. Adesko et al is subject to the same defects as Angelo et al.

U.S. Pat. No. 4,173,683 Comizzoli relates to a method of chemically treating a passivating overcoat of a semiconductor device immediately prior to encapsulating the device, the treating being with an organosilane.

IBM Technical Disclosure Bulletin, Vol. 20, No. 6, November 1977, page 2401, discloses an improved polyamic acid formulation of superior stability which is formed by mixing a solution of dimethyl sulfoxide containing pyromellitic dianhydride with a solution of 1-methyl-2-pyrrolidone containing diaminodiphenyl ether.

In the manufacture of integrated circuit modules and similar devices it is customary to seal the metal circuitry and connections between a substrate and integrated circuit chip devices with a polymer layer. Typically, a liquid conformal coating is coated over the devices and then cured to protect joints and pad areas against corrosion, migration, atmospheric contamination and moisture. The coating mechanically enhances chip joint reliability while serving as a dielectric insulator and penetrates under those chips having design configurations that contain internal joints/pad that, like perimeter joints/pads, also require coating coverage. The conformal coating can be applied by spin, spray, dip or dispense techniques. The method of application is optional, dependent upon product requirements.

Polyimide coatings have been used in the past as conformal coatings for electronic components and circuitry. However, prior to the present invention problems have been encounted in obtaining uniform coatings of such polyimide materials (due to the poor surface tension effects encountered) and with flammability problems due to the organic solvents used to apply the polyimide precursors which, after drying and curing, yield the objective polyimide coating.

Accordingly, one major objective of the present invention is to significantly reduce the surface tension of conformal protective coatings which greatly facilitates the ability of the coating to uniformly wet all joints and pad areas when, for example, coating modules where integrated circuit chips are joined to the substrate as described in U.S. Pat. No. 3,429,040, hereby incorporated by reference.

SUMMARY OF THE INVENTION

Per the present invention, it has been discovered that improved wire enamels consisting essentially of a polyimide precursor in a polar organic solvent are obtained if the polar organic solvent is partially replaced by a halogenated aliphatic hydrocarbon and a substituted hydrocarbon solvent having a polarity equal to or greater than the halogenated aliphatic hydrocarbon.

Major advantages of the use of such a polyimide/solvent mixture combination are:

Improved solubility for the polyimide precursors;

Improved planarization of the resulting conformal coating on irregular surfaces during electronic device manufacture, e.g., improved planarization on ceramics such as $Al_2O_3$;

Elimination of filleting due to high surface tension due to the polar solvent alone;

Better wetting and conformal coating around chip-substrate connections due to the reduced surface tension of the solvent system;

A reduction in the amount of solvent with a high latent heat of vaporization which reduces the total energy requirements for drying and curing;

A reduction in the amount of substituted hydrocarbons which minimizes the probability of undesirable reactions with flux and other process residues used during electronic component fabrication;

The use of greater amounts of high flash point solvents, which reduces flammability problems.

DESCRIPTION OF PREFERRED EMBODIMENTS

Polyimide materials are widely used in electronic applications for various sealing and insulating purposes. Typically, they are utilized in the form of a polyimide precursor in solution form which is applied to the desired area and then are dried and cured to result in the desired polyimide.

In the prior art, such polyimide precursors have typically been applied in solution in a polar organic solvent such as 1-methyl-2-pyrrolidone (NMP).

Polar solvents such as NMP have a very high surface energy which has led to coating problems associated with polyimide precursor wire enamels containing such a polar solvent.

Possible solutions to the coating problems have included multiple needle dispensing stations and the blending of low surface tension hydrocarbons with the NMP in volumes approaching 40% of the solution.

However, the use of such substantial proportions of low surface tension hydrocarbons, which simultaneously typically exhibit a low flash point, has created safety problems due to flammability.

Thus, the avoidance of significant proportions of any low flash point hydrocarbon would be desirable.

In accordance with the present invention, it has been found that all of the above-recited objects can be realized by replacing, in part, the polar organic solvent(s) in which the polyimide precursors are readily dissolved with one or more halogenated aliphatic hydrocarbons, e.g., trichlorotrifluoroethane, hereafter TCTFE for brevity, and one or more substituted hydrocarbon solvents having a polarity equal to, greater than or less than that of the halogenated aliphatic hydrocarbon such as TCTFE.

Polar organic solvents in which the polyimide precursor readily dissolves are typically substituted aliphatic hydrocarbons with dipole moments in the range of about 3 to about 5 Debye. Examples of the aliphatic hydrocarbons include: N,N-dimethylacetamide (3.72 Debye), N,N-dimethylformamide (3.86 Debye), 1-methyl-2-pyrrolidone (4.09 Debye) and dimethylsulfoxide (3.9 Debye).

Substituted aromatic solvents can also be used as polar solvents. They have a very low dipole moment in the range of about 0.0 to about 0.62 Debye. Examples of the substituted aromatic solvents include: toluene (0.36 Debye), p-xylene (0.0 Debye), m-xylene (0.37 Debye) and o-xylene (0.62 Debye).

The substituted hydrocarbon solvents should have a dipole moment of about 1 to about 3 Debyes and preferably a surface tension within the range of about 22 to about 35 dynes/cm. Typically, these solvents are normally classified as esters, alcohols, ketones, amines and amides. Substituted aromatic hydrocarbons possess an extremely low dipole moment due to the non-polar nature and symmetry of the benzene ring.

The halogenated aliphatic hydrocarbon should possess a dipole moment in the range of 0.0–0.8 Debye and preferably a surface tension of less than 22 dynes/cm.

The present invention offers the advantage of providing a chip coating which is uniform in film thickness and free of pinholes, voids and blisters.

Surface conditions, circuit metallurgy and complex pad configurations require improved wetting of the top seal protective coating to insure good film coverage. Pin holes, voids and blisters pose reliability problems and incomplete coverage or lack of coverage of polyimide coatings results in thermal stresses affecting uncoated joints/pads, which can create stress cracking at, and early failure of, uncovered joints. This is avoided per the present invention.

When coating protective coatings onto stacked modules, as shown in the earlier Angelo et al patent incorporated by reference, the advantage of improved wetting to insure coverage is even more important to insure adequate protection of all chip joints/pads.

The Polyimide Precursor

The exact nature of the polyimide precursor of the present invention is not overly important, and such can be freely selected from those polyimide precursors which are soluble in the solvent system of the present invention, i.e., those which are basically soluble in the polar organic solvent, though the TCTFE and the substituted hydrocarbon will also exhibit a solvating effect on the polyimide precursor and will be freely miscible with the polar solvent.

Other than the above characteristic, the polyimide precursor selected need only exhibit the characteristic of forming a thermally stable film at 450° C. for a minimum of one-half hour upon drying and curing.

For example, polyimide precursors per the present invention which yield the desired polyamide conformal coating can be freely selected from those disclosed in the Angelo et al patent incorporated by reference. The polyimide resins which are useful in the practice of the present invention are a class of polymers finding use in electronic packaging as protective coatings due to their excellent chemical resistance and high temperature stability properties. In addition, this group of thermoplastics exhibits good electrical as well as mechanical properties.

In addition, the polyamide acids disclosed in U.S. Pat. No. 3,179,614 Murray, hereby incorporated by reference, can also be used with success in the present invention.

Typical polyimide precursors include those of the following formulae:

AI 10,11 (TRADEMARK OF AMOCO CHEMICALS)

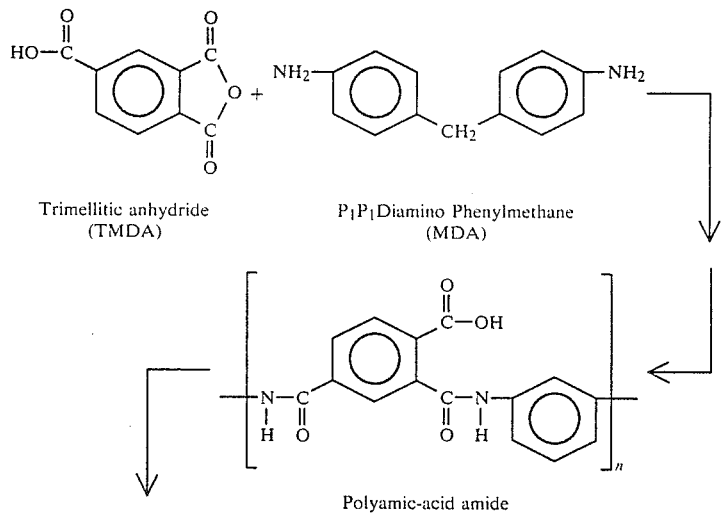

Trimellitic anhydride (TMDA)

$P_1P_1$ Diamino Phenylmethane (MDA)

Polyamic-acid amide

-continued
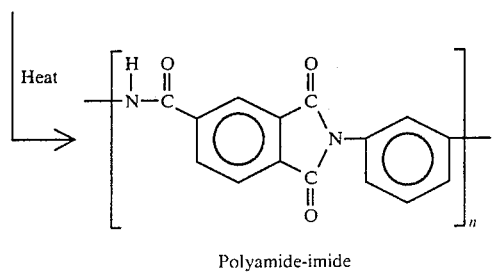
Polyamide-imide
PI-2525,2550 (TRADEMARK OF E. I. du PONT de NEMOURS Co)
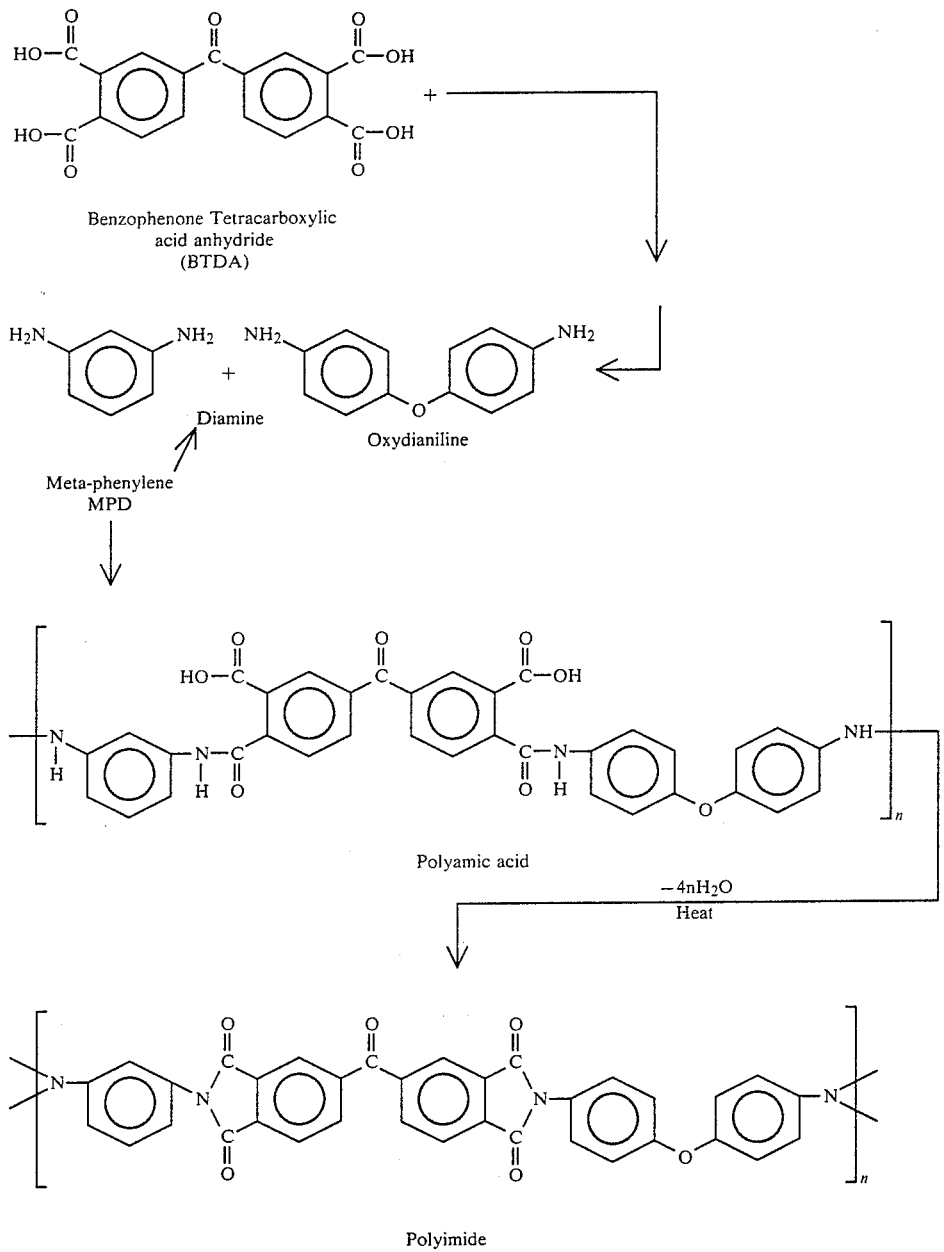
PI-5878 (TRADEMARK OF E. I. du PONT de NEMOURS Co)

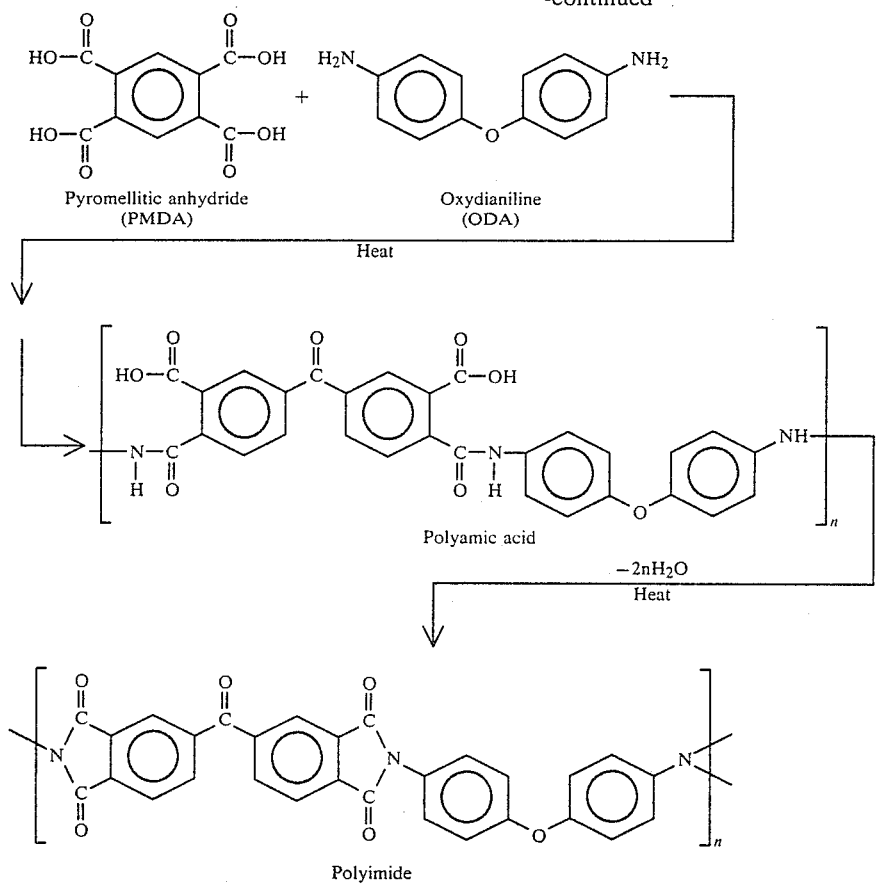

PI-2525 comes in a solvent system of N-methyl-2-pyrrolidone. PI-2550 comes in a solvent system of N-methyl-2-pyrrolidone/acetone, 70/30±5%.

PI-5878 (now available as PI-2540 and PI-2545) comes in a solvent system of N-methyl-2-pyrrolidone/aromatic hydrocarbon, 80/20±5%.

The Polyimides

The polyimides are the reaction product of dianhydrides and diamines, for example, benzophenone tetracarboxylic acid anhydride (BTDA) and oxydianilane (4,4'-diaminodiphenylether) (ODA). Reference should be made to the Angelo et al patent and the Edwards patent earlier incorporated by reference for a more detailed discussion of useful aromatic polymers which, when cured, form the desired polyimide.

The preferred polyimides useful in the present invention have number average molecular weights from about 10,000 to about 80,000 determined by the light scattering method. These materials are most suitable for the present invention since they possess high temperature stability in coating formulations with good electrical properties at temperatures up to about 450° C. after imidization.

The Polar Organic Solvent

Polar organic solvents used per the present invention must exhibit the characteristic of completely solubilizing the polyimide precursor. If this characteristic is exhibited, in theory any polar organic solvent can be used per the present invention.

Typically, the polar organic solvent will have a polarity greater than about 3.0 Debyes, though this is not limitative.

However, as a practical matter, the polar organic solvent must exhibit other physical characteristics which render the same easy to handle and safe in use, with other important processing parameters desirable to easily form a polyimide wire enamel including the lowest possible surface tension, when the same is used to form a polyimide precursor solution, and an appropriate evaporation time.

Illustrative polar organic solvents used to form the polyimide precursor wire enamel solution include, in addition to NMP, N,N-dimethyl formamide, N,N-dimethyl acetamide, dimethyl sulfoxide and the like.

These polar organic solvents illustrate the following characteristics:

| Solvent | DiPole Moment (Debyes) | Surface Tension (Dynes/cm) | Viscosity at 25° C. (centipoises) | Boiling Point °C. | Flash Point °C. |
|---|---|---|---|---|---|
| Dimethyl-acetamide | 3.72 | 33.16 | 0.838 | 166 | 70° |
| 1-methyl-2-pyrrolidone | 4.09 | 40.7 | 1.65 | 202.2 | 95° |
| Dimethyl-sulfoxide | 3.9 | 43.54 | 1.096 | 189 | 95° |
| Dimethyl-formamide | 3.86 | 36.76 | 0.802 | 153 | 67° |

The above solvents are used for the formation of a polyimide wire enamel in the present invention due to their commercial availability and restrictions imposed by EPA and/or OSHA. Other polar organic solvents that can be used are disclosed in Table I of the Angelo et al patent earlier incorporated by reference.

A major problem encountered with using polar solvents for the polyimide precursors in combination with halogenated aliphatic hydrocarbon is that the moderate polar nature of the halogenated aliphatic hydrocarbon results in polyimide precipitation as the percentage of the halogenated aliphatic hydrocarbon approaches 20% by weight of the total solution.

A major advantage of the present invention is that the percentage of halogenated aliphatic hydrocarbon that can be added to the wire enamel solution can be increased significantly through the addition of a substituted hydrocarbon component per the present invention.

The Substituted Aliphatic and Aromatic Hydrocarbon

The major characteristic that the substituted hydrocarbon of the present invention must exhibit is that the polarity thereof must be equal to or greater than the polarity of halogenated aliphatic hydrocarbon when the same is a substituted aliphatic hydrocarbon or the polarity thereof is less than that of the halogenated aliphatic hydrocarbon when the same is a substituted aromatic hydrocarbon.

The substituted hydrocarbons that meet this requirement are not unduly limited, and include, e.g., aliphatic substituted hydrocarbons such as alcohols, ketones, aliphatic ethers, amines, amides and substituted aromatic solvents.

Preferred substituted aliphatic or aromatic hydrocarbons in accordance with the present invention include acetone, methyl ethyl ketone, methyl cellosolve acetate, cellosolve acetate, toluene, xylene, isopropyl alcohol, formamide, n-butyl amine and the like.

Substituted hydrocarbons as above possess an excellent balance of low heat of vaporization, low surface energy, low boiling point, low viscosity and a polarity which approaches that of the polar polyimide precursor wire enamel solvent.

The Halogenated Aliphatic Hydrocarbons

The halogenated aliphatic hydrocarbons used per the present invention typically exhibit the following characteristics: surface tension of less than 22 dynes/cm, latent heat evaporation of less than 85 cal./gram, boiling point of less than 49° C., dipole moment of less than 0.8 Debye, liquid viscosity of less than 0.85 cp and a flash point above 250° C.

Useful halogens include chlorine, bromine, fluorine, iodine and combinations thereof.

TCTFE possesses the following physical characteristics which makes it highly desirable as a solvent for the conformal coating systems of the present invention: surface tension—17.3 dynes/cm; latent heat of vaporization—35.07 cals/grams; viscosity—0.682 centipoises; boiling point—47.6° C.; and flash point—300° C.

Trichloromonofluoromethane possesses the following physical characteristics which makes it a suitable substitute for TCTFE in the conformal coating systems of the present invention: surface tension of 16 dynes/cm, viscosity of 0.42 cp, boiling point of 23.82° C., a flash point in excess of 300° C., a dipole moment of 0.45 Debye and a latent heat of evaporation of 43.10 cal/gram.

For this reason, the addition of such fluorinated hydrocarbons to a polyimide precursor wire enamel solution which contains a polar organic solvent can significantly reduce the surface tension of the solution and the effective evaporation time without increasing the flash point of the solution, the reduced surface tension of the resulting solution leading to the benefits described herein, the high vapor pressure associated with halogenated aliphatic hydrocarbons in fact assisting to suppress the flammability of the low flash point substituted hydrocarbon solvents.

Polyimide Precursor Solution Proportions

The polar organic solvent used to form the polyimide precursor solution which will result in the wire enamel comprises at least 50% by weight of the solution. Greater amounts can be used, but generally no more than about 98% by weight will be used since this results in amounts of polyimide precursor with respect to solvent that require multiple applications, obviously not desired.

The amount of the polyimide precursor or precursors is not unduly limited but will typically be on the order of about 2-8% by weight of the solution. Lesser amounts lead to multiple application of the precursor solution and greater amounts lead to viscosity problems. However, greater and lesser amounts can be used with success.

The fluorinated hydrocarbon will generally be used in an amount of 5-35% by weight of the solution.

The substituted hydrocarbons will generally be used in an amount of about 0.5-25% by weight of the solution.

The addition of a small amount of one or more of the above substituted hydrocarbons offers the advantages discussed herein. It should be noted, however, that it is preferred that the substituted hydrocarbon be used in an amount as low as possible since the substituted hydrocarbons typically possess a low flash point which could lead to flammability problems.

Optional Silane Additive

Finally, a silane additive can be used in an amount of 0-1% by weight, same basis. The silane additive modifies the distribution of the polyimide precursor, and the final polyimide, around the desired electrical component as well as promoting adhesion of the polyimide resin to metallic surfaces upon which it is applied.

Silane additives useful per the present invention generally exhibit the following characteristics: they comprise an aliphatic molecule with primary amine termination for bonding with the polyamic acid and with ternary siloxane termination for surface oxide bonding. Representative examples include γ-aminopropyltriethoxy silane, γ-glyciloxypropyltrimethyloxy silane, β-(3,4-epoxycyclohexyl)ethyltrimethoxy silane and phenyltriethyoxy silane.

Drying and Curing Schedules

After the polyimide precursor solution of the present invention containing the appropriate solvent system is applied to the area to be sealed, it is necessary to dry and cure the resulting coating to form the desired seal.

Typically drying is at about 100° C. to 120° C. for from about 5 to 15 minutes. Drying is typically at ambient pressure.

Following drying, curing is typically at from about 140°–160° C. for 1 hour followed by curing at 170°–185°

C. for a minimum of 3 and a maximum of 4½ hours. If desired, a partial vacuum can be used to shorten the cycle time or lower the required temperatures.

In practice a polyimide precursor protective coating comprising at least 50% by weight and generally up to about 98% by weight polar organic solvent, 5-40% by weight halogenated aliphatic hydrocarbon, 2-8% by weight polyimide precursor, 0.5-25% by weight substitute hydrocarbon and 0-1% by weight silane additive is coated in a quantity of 10 to 300 mg over a chip device to coat the solder joints/pad area. The exact thickness of the protective film coating on the solder joint/pad is not critical so long as there is complete coverage. Typically, the final polyimide film should be uniform and from on the order of 1 micron to 30 microns in thickness. Excessive filleting at the chip/substrate interface should be prevented to avoid excess thermal stress at the chip interface resulting in cracks due to the different coefficients of expansion of the polyimide polymer and the solder used, typically an Sn-Pb solder.

Following application, drying and curing are at the conditions heretofore given. One skilled in the art will appreciate that drying and curing times can be optimized for any particular mixture of polyimide precursors and solvents.

Having thus generally described the invention, the following examples are offered to further illustrate the present invention.

EXAMPLES

The following wire enamels were formed by blending the recited components. Blending was at ambient temperature using a conventional mixture. The order of addition of the various components is unimportant.

Example 1

| | |
|---|---|
| 1-methyl-2-pyrrolidone | 54.52 |
| Trichlorotrifluoroethane | 20.5 |
| Toluene | 17.0 |
| γ-aminopropyltriethoxysilane | 0.36 |
| β-(3,4-epoxycyclohexyl)ethyltrimethoxy silane | 0.36 |
| Polyamide-imide precursor powder (AI-10 polymer from Amoco) | 7.26 |
| | 100% |

Example 2

| | |
|---|---|
| 1-methyl-2-pyrrolidone | 54.52 |
| Trichloromonofluoromethane | 20.5 |
| Xylene | 17.0 |
| γ-aminopropyltriethoxysilane | 0.36 |
| β-(3,4-epoxycyclohexyl)ethyltrimethoxysilane | 0.36 |
| Polyamide-polyimide precursor powder (AI-10 polymer from Amoco) | 7.26 |
| | 100% |

Example 3

| | |
|---|---|
| 1-methyl-2-pyrrolidone | 48.3 |
| Trichlorotrifluoroethane | 20.7 |
| Toluene | 21.0 |
| Polyamic acid-amide precursor (PI5878 stock solution from DuPont) | 10.0 |
| | 100% |

Example 4

| | |
|---|---|
| 1-methyl-2-pyrrolidone | 54.52 |
| Trichlorotrifluoroethane | 20.5 |
| Diglyme | 17.0 |
| γ-aminopropyltriethoxysilane | 0.36 |
| β-(3,4-epoxycyclohexyl)ethyltrimethoxy silane | 0.36 |
| Polyamide-polyimide precursor powder (AI-10 polymer from Amoco) | 7.26 |
| | 100% |

Example 5

| | |
|---|---|
| 1-methyl-2-pyrrolidone | 54.52 |
| Trichloromonofluoromethane | 20.5 |
| Diglyme | 17.0 |
| γ-aminopropyltriethoxysilane | 0.36 |
| β-(3,4-epoxycyclohexyl)ethyltrimethoxysilane | 0.36 |
| Polyamide-imide precursor powder (AI-10 polymer from Amoco) | 7.26 |
| | 100% |

Example 6

| | |
|---|---|
| 1-methyl-2-pyrrolidone | 48.3 |
| Trichlorotrifluoroethane | 20.7 |
| Diglyme (2-methoxyethylether) | 21.0 |
| Polyamic acid-amide precursor | 10.0 |
| (PI-5878 stock solution from DuPont; 16.5 ± .5 wt. % solution; viscosity = 64 poises ± 5 poises) | |
| | 100% |

Each of the polyimide precursor protective coating compositions could be coated in an amount of 10 to 300 mg over a chip device, dried at 100°-120° C. for about 5 to 15 minutes and then cured at about 140°-160° C. for one hour followed by curing at 170°-185° C. for a minimum of 3 and a maximum of 4½ hours to provide the desired uniform polyimide film having a thickness of from 1 micron to 30 microns.

While there have been described what are at present considered to be the preferred embodiments of this invention, it will be obvious to those skilled in the art that various changes and modifications can be made therein without departing from the invention, and it is, therefore, intended to cover all such changes and modifications as fall within the true spirit and scope of the invention.

We claim:

1. An improved wire enamel consisting essentially of the following materials by weight wherein basis is wire enamel weight:

at least 50% by wt. of a polar organic solvent which is a substituted aliphatic hydrocarbon having a dipole moment of about 3 to about 5 Debyes or a substituted aromatic hydrocarbon having a dipole moment of about 0.0 to about 0.62 Debye and is selected from the group consisting of N,N-dimethylacetamide, N,N-dimethylformamide, 1-methyl-2-pyrrolidone, dimethylsulfoxide, toluene, p-xylene, m-xylene and o-xylene;

about 2-8% by wt. of a polyimide precursor which can be cured to yield a polyimide polymer;

about 0.5 to about 25% by weight of a substituted aliphatic hydrocarbon solvent for said polyimide precursor having a surface tension and polarity greater than that of the halogenated aliphatic hydrocarbon described below or a substituted aromatic hydrocarbon having a dipole moment less than or equal to the dipole moment of the halogenated aliphatic hydrocarbon described below, the substituted aliphatic hydrocarbon having a dipole moment of about 1 to about 3 Debyes and a surface tension of about 22 to about 35 dynes/cm, the substituted aliphatic hydrocarbon and the substituted aromatic hydrocarbon being different from the polar organic solvent and being selected from the group consisting of esters, alcohols, ketones, amines and amides;

about 5 to 40% by wt.. of a halogenated aliphatic hydrocarbon having a dipole moment of 0.0 to 0.8 Debye and a surface tension less than 22 dynes/cm, the halogenated aliphatic hydrocarbon having a boiling point less than 49° C.; and 0 to about 1% by wt. of an organosilane which increases the adhesion of the polyimide to an underlying substrate.

2. A process for forming a seal coating on electronic circuitry comprising:

applying to said circuitry a filler-free coating material which consists essentially of the wire enamel of claim 1.

3. The wire enamel of claim 1 wherein the substituted aliphatic or aromatic hydrocarbon solvent different from the polar organic solvent is selected from the group consisting of acetone, methyl ethyl ketone, methyl cellosolve acetate, cellosolve acetate, toluene, xylene, isopropyl alcohol, and n-butyl amine.

4. The wire enamel of claim 1 wherein the halogenated aliphatic hydrocarbon is selected from the group consisting of trichloromonofluoromethane and trichlorotrifluoroethane.

5. The process of claim 2 further comprising drying and curing the applied filler-free coating material.

6. A process for forming a seal coating on electronic circuitry comprising:

applying to said circuitry a filler-free coating material which consists essentially of the wire enamel of claim 3.

7. A process for forming a seal coating on electronic circuitry comprising:

applying to said circuitry a filler-free coating material which consists essentially of the wire enamel of claim 5.

* * * * *